(No Model.)
M. O'BRIEN.
SHIELD FOR PNEUMATIC TIRES.
No. 589,019. Patented Aug. 31, 1897.
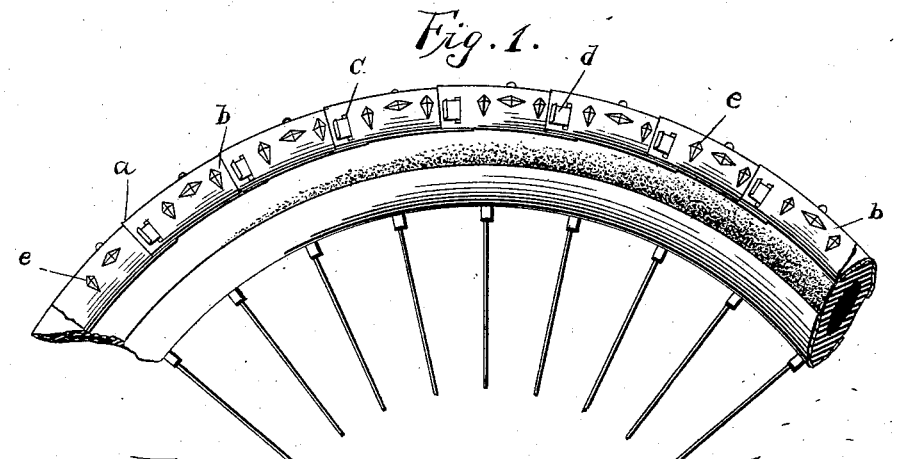
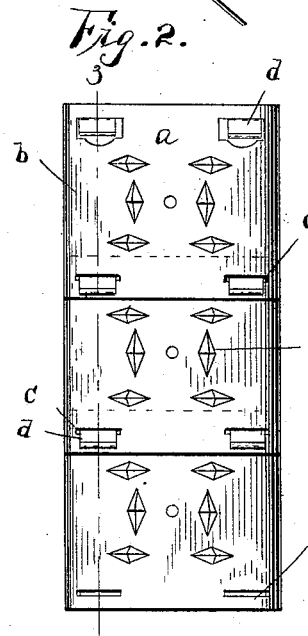 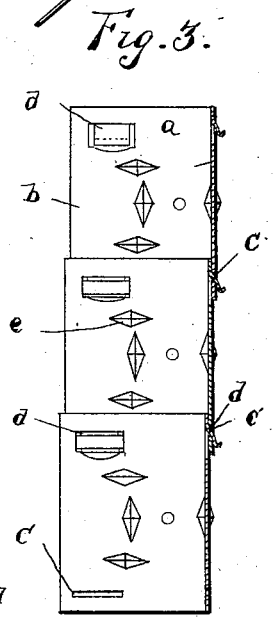
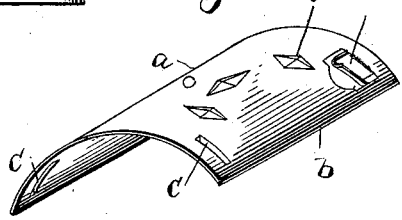
Witnesses
F. C. Barry
O. E. Duffy
Inventor
Maurice O'Brien
per O. E. Duffy
Attorney

UNITED STATES PATENT OFFICE.

MAURICE O'BRIEN, OF FRESNO, CALIFORNIA.

SHIELD FOR PNEUMATIC TIRES.

SPECIFICATION forming part of Letters Patent No. 589,019, dated August 31, 1897.

Application filed October 27, 1896. Serial No. 610,227. (No model.)

*To all whom it may concern:*

Be it known that I, MAURICE O'BRIEN, of Fresno, in the county of Fresno and State of California, have invented certain new and useful Improvements in Shields for Pneumatic Tires; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain new and useful improvements in shields for pneumatic tires, preventing the puncture thereof.

The object of the invention is to provide a shield simple, cheap, and durable in construction, easy of adjustment, and effective in operation.

A further object is to form the shield in sections securely but movably jointed to conform to the periphery of and to fit any size tire.

A further object is to provide these sections with crimps or corrugations to prevent slipping and sliding of the wheel on wet or icy surfaces.

In the drawings, Figure 1 is a side elevation of a portion of a wheel with pneumatic tire provided with my improved shield. Fig. 2 is a top plan view of several sections joined. Fig. 3 is a longitudinal section taken on the line 3 3, Fig. 2; and Fig. 4 is a detail perspective of a single section.

Referring by letter to the accompanying drawings, $a$ is the shield, composed of the sections $b$, flexibly connected. Each section $b$ is provided with the slots $c$ in one end adapted to engage the tongues $d$ in the opposite end of the following section.

$e$ are the crimps or corrugations to roughen the outer surface or tread of the shield to prevent slipping on smooth places.

The simplicity, durability, and efficiency of this device are obvious. Each section is made of a single piece and can be stamped out with one stroke of a die, curved to the desired arc, and easily linked together.

A puncture of the pneumatic tire is impossible when the improved shield is in use, as the shield would have to be penetrated before an instrument or sharp object could reach the tire.

In adjusting my shield to a wheel the necessary number of sections are coupled together around the tire and the tire then inflated until the shield fits tightly, holding it securely in place.

Should by any reason the tire become slack or from wear the shield become loose, it is only necessary to remove one or more sections until the shield again snugly fits the tire.

It is evident that various slight changes might be made in the forms, construction, and arrangement of the parts described without departing from the spirit and scope of my invention, and I do not wish to limit myself to the exact construction set forth, but consider myself entitled to all such changes that fall within the limit of my invention.

The lightness of this device is apparent, as only thin metal or other light material would be suitable.

The corrugations or crimps on the tread of the shield may be dispensed with, if so desired, and the ends of the tongues $d$ curved or turned backward after passing through the slots $c$ to form the roughness necessary to prevent accidents.

Having thus fully described my invention, what I claim, and wish to secure by Letters Patent of the United States, is—

A shield for pneumatic tires comprising semicircular sections, corrugations on the outer periphery thereof, a double series of slots and tongues in each section, the tongues adapted to engage said slots longitudinally around the wheel and bent back after passing through said slots to form additional roughness for the purpose set forth.

In testimony that I claim the foregoing as my own I affix my signature in presence of two witnesses.

MAURICE O'BRIEN.

Witnesses:
J. J. RAHILL,
W. C. SWOAP.